(No Model.)
I. H. SPELMAN.
SAW SET AND TOOTH HOLDER.
No. 557,908. Patented Apr. 7, 1896.
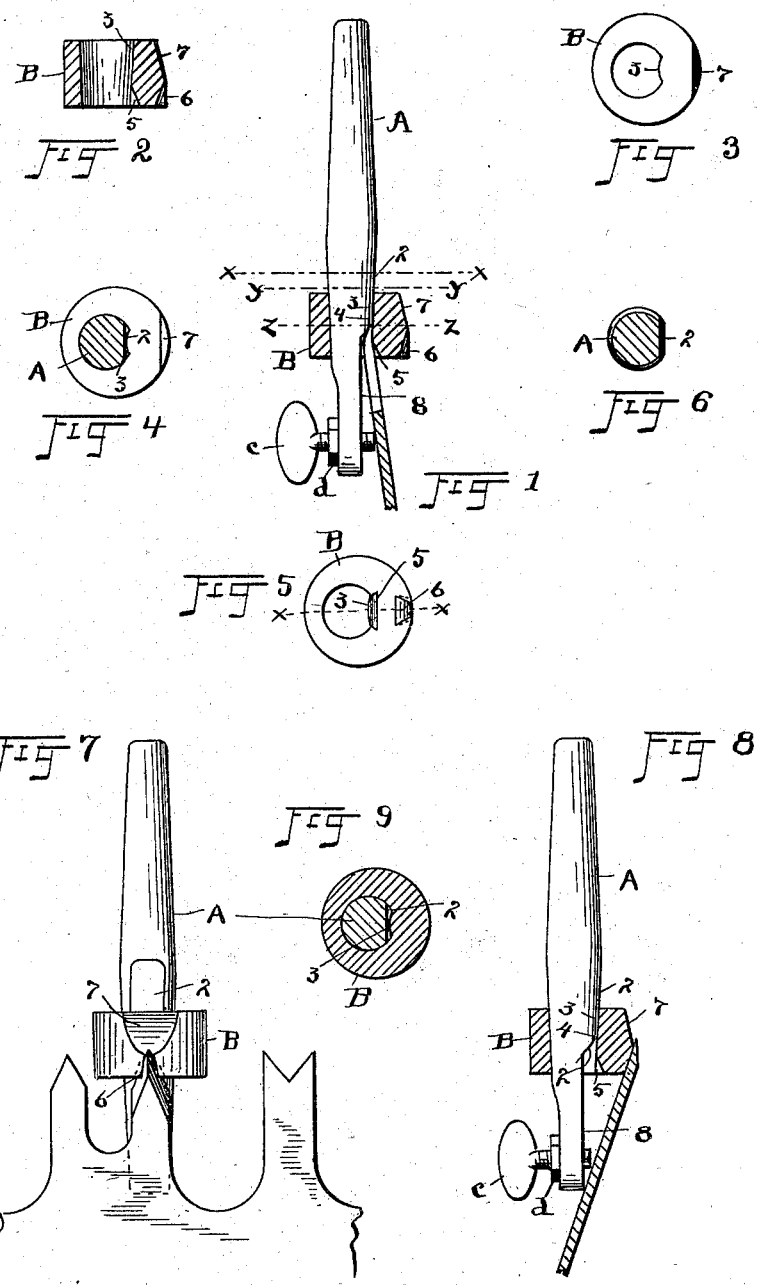
ATTEST.
R. B. Moser.
Nellie L. McLain
By H. T. Fisher
ATTORNEY.
INVENTOR.
Irwin H. Spelman

UNITED STATES PATENT OFFICE.

IRWIN H. SPELMAN, OF CORTLAND, OHIO.

SAW-SET AND TOOTH-HOLDER.

SPECIFICATION forming part of Letters Patent No. 557,908, dated April 7, 1896.

Application filed June 16, 1892. Serial No. 437,000. (No model.)

*To all whom it may concern:*

Be it known that I, IRWIN H. SPELMAN, a citizen of the United States, residing at Cortland, in the county of Trumbull and State of Ohio, have invented certain new and useful Improvements in Saw-Sets and Tooth-Holders; and I do hereby declare that the following is a full, clear, and exact description of the invention, which will enable others skilled in the art to which it appertains to make and use the same.

My invention relates to saw-sets and tooth-holders; and it consists in the construction shown and described, and particularly pointed out in the claims.

In the accompanying drawings, Figure 1 is a view corresponding to Fig. 8, but with a tooth in position to be set. Fig. 2 is a cross-section of the collar of the setting and holding device on line $x\,x$, Fig. 5. Fig. 3 is a top or plan view of Fig. 5. Fig. 4 is a cross-section on line $y\,y$, Fig. 1, and designed to show the flat side of the handle inclined as shown in Fig. 1, which causes the collar or head to tighten on the handle, as well as the bevel above the filing-notch. Fig. 5 is a bottom view of the collar alone. Fig. 6 is a cross-section of the handle alone on line $x\,x$, Fig. 1. Fig. 7 is a side elevation of a section of a crosscut-saw, showing my improved device in position on a tooth preparatory to filing or sharpening the point of the tooth. Fig. 8 is a cross-section of said device and of the saw, showing the parts as they are shown in Fig. 1. Fig. 9 is a cross-section of the device on a line corresponding to $z\,z$, Fig. 1.

A represents the handle of the set and holder, and B the collar, ferrule, or head, which is removable from the handle, but is designed to be firmly secured or locked thereon. To this end the handle is made slightly tapering at about its middle portion, where the collar fits, and has a flat side 2, which fits a corresponding flat portion 3 in the collar. This flat portion 2 of the handle is straight until it reaches about the point 4, from which it rounds or curves inward somewhat abruptly, as seen in Fig. 8, so as to make room for the saw-tooth. When the collar is on the handle, the said rounded or convex portion terminates really above the center of the collar, and the point of the tooth is deflected in setting from this rounded face to the extremity of the open space above and is packed or swaged by the act of setting, so that the point is improved in working quality as well as given the required setting.

The interior of the collar is made slightly tapering to correspond to the handle and in addition to the flat surface 3 has a flaring beveled portion 5, which is made to give clearance for the tooth as the point is driven into the set or the set is driven upon the tooth, as seen in Fig. 1. It will be seen in Fig. 1 that I employ a set-screw $c$, having a jam or lock nut $d$, to bear against the saw and gage the depth of the set. By means of this screw I can regulate the set of the tooth to any desired width of cut, and, having fixed the set and locked nut $d$, the teeth will all be set with exact uniformity and there will be no variance in them; but the bevel or cut-away flat surface 5 is necessary to make room for the tooth on that side when the set is driven down upon it. This bevel 5 is so wide that it will accommodate short wide stub teeth as well as those more pointed, and it terminates above at about the point where the set of the tooth begins, so that it facilitates setting, but does not hinder it.

Obviously when the device is placed on a tooth to be set the point of the tooth will bear against the convex surface 2, which rounds only one way and is flat across the other way, while the set-screw $c$ will bear against the saw, as seen in Fig. 1. Then in striking a blow on the set the tooth-point will glance outward over said rounded surface and be impacted in the contracted space provided for it where said rounded portion terminates against the inside of the band. It will be seen that in this operation the setting device is on the reverse side from that which is usually occupied by devices of this general character, and in this I get the great advantage of having the set do absolutely all the work, and hand work or strain is avoided. The tendency when the hammer strikes the handle is for the strain to go through the set-screw against the saw, and here it is held by the spring and resistance of the tooth that is set. This is directly the reverse of all other sets known to me and a great advantage both in the uniformity of the work produced and in the ease and rapidity with which the work can be done. It will be noticed that by this construction and by reason of only the point of the tooth being bent instead of bending the tooth down toward its base, a very little power, comparatively, is required to do the setting.

By having the setting-point in the collar about midway I avoid all danger of splitting, cracking, or breaking out the edge of the ferrule, as is liable to occur in cases when the work is done at the edge.

In Figs. 7 and 8 I show a tooth in the beveled recess 6 of the collar, and this is designed as a means of holding and protecting the tooth while the dull point thereof is filed down and dressed. The collar has a beveled and tempered portion 7 above said recess, which prevents the file from striking beneath a certain depth and protects the point of the tooth. The said recess 6 is tapered at its edges to correspond to the edges of the tooth and is undercut slightly to adapt it to the bevel of the tooth along its edges. This enables the dull points all to be filed down uniformly either before or after setting.

It may be further explained that the handle A is reduced at 8 below the rounded or beveled portion of the flat surface 2, so as to enable the tooth to be operated upon as herein described.

It will be seen in Fig. 9 that the flat sides 2 and 3 of collar and handle are practically as wide where said sides run together as they are farther down or higher up in the device and do not run to a converging point except upon their opposed faces.

Having thus described my invention, what I claim as new, and desire to secure by Letters Patent, is—

1. The handle A having the flat surface 8 at its lower end, and the shoulder 4 where said surface terminates, in combination with the sleeve-head on said standard and a recess in said head opposite shoulder 4 and rounded on its face, substantially as set forth.

2. The handle having a set-screw in its lower end to bear against the side of the saw, and a shoulder 4 above said screw, in combination with the head B having a beveled portion 5 and a recess above said beveled portion for the point of the tooth to enter, substantially as set forth.

Witness my hand to the foregoing specification this 18th day of May, 1892.

IRWIN H. SPELMAN.

Witnesses:
H. T. FISHER,
NELLIE L. MCLANE.